(12) United States Patent
Liu (10) Patent No.: US 10,193,221 B2
(45) Date of Patent: Jan. 29, 2019

(54) REFLECTOR ANTENNA AND REFLECTOR ANTENNA FEED (71) Applicant: Huawei Technologies Co., Ltd., Shenzhen (CN)

(72) Inventor: Yu Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/674,112

(22) Filed: Aug. 10, 2017

(65) Prior Publication Data

US 2017/0338554 A1 Nov. 23, 2017

Related U.S. Application Data (63) Continuation of application No. PCT/CN2015/073004, filed on Feb. 13, 2015.

(51) Int. Cl.
*H01Q 1/52* (2006.01)
*H04L 5/14* (2006.01)
*H01Q 19/13* (2006.01)
*H01Q 19/17* (2006.01)
*H01Q 21/06* (2006.01)

(52) U.S. Cl.
CPC .......... *H01Q 1/525* (2013.01); *H01Q 1/523* (2013.01); *H01Q 19/17* (2013.01); *H01Q 19/132* (2013.01); *H01Q 21/064* (2013.01); *H04L 5/1461* (2013.01)

(58) Field of Classification Search
CPC .................................................. H01Q 1/525
See application file for complete search history.

(56) References Cited

U.S. PATENT DOCUMENTS

| 6,509,883 B1* | 1/2003 | Foti | H01P 1/161 343/850 |
| 2010/0117893 A1* | 5/2010 | Dreher | B64G 1/66 342/352 |
| 2013/0307747 A1* | 11/2013 | Koide | H01Q 1/525 343/853 |
| 2014/0292606 A1 | 10/2014 | Hayakawa et al. | |
| 2014/0340271 A1* | 11/2014 | Petkov | H01Q 1/523 343/776 |
| 2016/0211963 A1* | 7/2016 | Liu | H01Q 1/525 |

FOREIGN PATENT DOCUMENTS

| CN | 102882009 A | 1/2013 |
| CN | 102914766 A | 2/2013 |
| CN | 103378414 A | 10/2013 |
| DE | 102014203185 A1 | 10/2014 |
| WO | 9735359 A1 | 9/1997 |

* cited by examiner

*Primary Examiner* — Howard Williams
(74) *Attorney, Agent, or Firm* — Slater Matsil, LLP (57) ABSTRACT

Embodiments of the present invention provide a reflector antenna and a reflector antenna feed. The reflector antenna feed includes a transmit antenna array and a receive antenna array, where the transmit antenna array includes at least two transmit antenna units. The receive antenna array includes at least two receive antenna units. Also, a phase center of the transmit antenna array coincides with that of the receive antenna array, where at least one coupling unit is disposed between at least one group of a transmit antenna unit and a receive antenna unit that are adjacent to each other.

14 Claims, 5 Drawing Sheets

REFLECTOR ANTENNA AND REFLECTOR ANTENNA FEED

CROSS-REFERENCE TO RELATED APPLICATIONS

This application is a continuation of International Application No. PCT/CN2015/073004, filed on Feb. 13, 2015, the disclosure of which is hereby incorporated by reference in its entirety.

TECHNICAL FIELD

Embodiments of the present invention relate to the field of antenna technologies, and in particular, to a reflector antenna and a reflector antenna feed.

BACKGROUND

An antenna is a critical component in wireless communication and microwave communication, and may implement mutual conversion between a high frequency electrical signal and a wireless signal or a microwave signal. In the wireless communication and the microwave communication, an antenna is used to transmit or receive a wireless signal or a microwave signal.

In the microwave communication, a reflector antenna is most used, and the reflector antenna includes a feed and a reflector. In a transmit state, a signal transmitted by the feed is radiated outwards by means of reflection of the reflector. In a receive state, a signal received by the reflector is reflected to the feed and is transmitted to a radio frequency circuit connected to the feed. A receive link and a transmit link of the reflector antenna need to share the reflector and the feed. Therefore, if the receive link and the transmit link operate in a duplex mode, the receive link is interfered by the transmit link.

In current microwave communication, a duplexer is used to increase isolation between the receive link and the transmit link, so as to suppress interference caused by the transmit link to the receive link. However, a volume of the duplexer is relatively large, and an operating frequency band of the duplexer cannot cover an entire microwave communication frequency band, resulting in a variety of microwave devices. Using an independent receive antenna and an independent transmit antenna can avoid using the duplexer; however, the independent receive antenna and the independent transmit antenna need to occupy more deployment space, and are also more costly.

Therefore, the present embodiments are intended to ensure that the reflector antenna implements duplex transmission and receiving, and in addition, decrease a volume of the reflector antenna.

SUMMARY

Embodiments of the present invention provide a reflector antenna and a reflector antenna feed, so as to implement duplex transmission and receiving of the reflector antenna, and in addition, decrease a volume of the reflector antenna.

According to a first aspect, a reflector antenna feed is provided, including a transmit antenna array and a receive antenna array. The transmit antenna array includes at least two transmit antenna units, the receive antenna array includes at least two receive antenna units, and a phase center of the transmit antenna array coincides with that of the receive antenna array. At least one coupling unit is disposed between at least one group of a transmit antenna unit and a receive antenna unit that are adjacent to each other, where the at least one coupling unit is configured to reduce interference caused by the transmit antenna array to the receive antenna array.

According to a second aspect, a reflector antenna is provided, including a feed, a reflector, and a power distribution network. The feed includes a transmit antenna array and a receive antenna array, where the transmit antenna array includes at least two transmit antenna units, the receive antenna array includes at least two receive antenna units, a phase center of the transmit antenna array coincides with that of the receive antenna array, and the phase centers of the transmit antenna array and the receive antenna array coincide with a focus on the reflector. The power distribution network includes a transmit power distribution network and a receive power combination network, the transmit antenna array is connected to the transmit power distribution network, and the receive antenna array is connected to the receive power combination network. At least one coupling unit is disposed between at least one group of a transmit antenna unit and a receive antenna unit that are adjacent to each other, where the at least one coupling unit is configured to reduce interference caused by the transmit antenna array to the receive antenna array.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present embodiments.

In microwave communication, a reflector antenna is generally used as a transmission antenna, so as to improve transmit power of a microwave signal. The reflector antenna has a relatively narrow beam and concentrated energy, and therefore is applicable to relatively high frequency microwave communication. The microwave communication is generally point-to-point duplex communication, and a receive link and a transmit link share the reflector antenna.

Generally, the reflector antenna includes a feed and a reflector. If a microwave device needs to operate in a duplex mode, a duplexer needs to be disposed between a transmitter and a receiver, to ensure isolation between receiving and transmission, and prevent the transmitter from affecting the receiver. Therefore, the transmitter and the receiver share a same reflector antenna. However, the duplexer has a relatively large volume, and is relatively costly.

If an independent feed is disposed on both the transmitter and the receiver, to increase isolation between the transmitter and the receiver without using the duplexer, phase centers of independent feeds cannot be simultaneously disposed on a focus on the reflector. Otherwise, the point-to-point communication cannot be supported.

Two independent array antennas are respectively used as a feed of a reflector antenna receive end and a feed of a reflector antenna transmit end, and phase centers of the two independent array antennas may coincide by adjusting an arrangement manner of antenna units in the two independent array antennas, for example, the antenna units of the two arrays are alternately disposed. A phase center of an array antenna refers to a theoretically equivalent radiation source point of the array antenna. Theoretically, a radiation signal of an antenna is radiated outwards by using a phase center as a center. A phase center of an array antenna whose antenna units are uniformly arranged is generally located on a straight line that is perpendicular to an antenna surface and that passes through a geometric center of the antenna.

Figure 1:
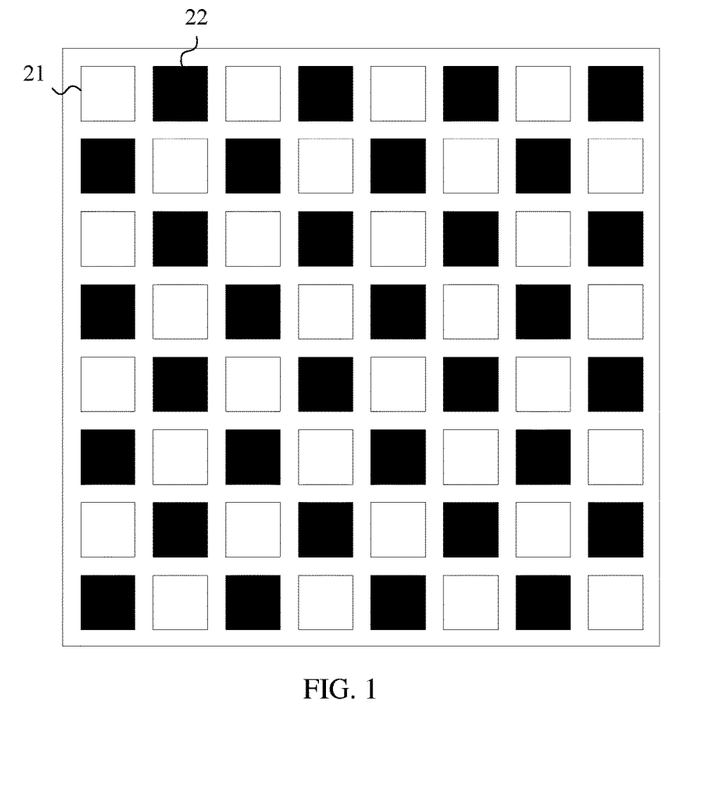
FIG. 1 is a schematic diagram of two alternately disposed array antennas.

As shown in FIG. 1, FIG. 1 is a schematic diagram of an array antenna. In FIG. 1, antenna units 21 form a first antenna array, antenna units 22 form a second antenna array, and the antenna units 21 and the antenna units 22 are all microstrip antennas. Each antenna unit 21 is the same as each antenna unit 22, and spacings between each antenna unit 21 and each antenna unit 22 are the same. The antenna units 21 and the antenna units 22 jointly form an antenna array. It is assumed that the first antenna array consisting of the antenna units 21 is connected to a transmit power distribution network, and the second antenna array consisting of the antenna units 22 is connected to a receive power combination network. The antenna units 21 and the antenna units 22 are uniformly arranged. Therefore, a phase center of the first antenna array coincides with that of the second antenna array. The array antenna shown in FIG. 1 may share an antenna aperture. Using the array antenna shown in FIG. 1 as a feed of a reflector antenna enables the reflector antenna to be applied to duplex communication.

However, the antenna units 21 and the antenna units 22 are alternately disposed. Therefore, when transmitting a signal, each antenna unit 21 causes interference to the antenna units 22. A closer distance between the antenna unit 21 and an antenna unit 22 indicates stronger interference. In the antenna array shown in FIG. 1 that uses a microstrip antenna, isolation between the first antenna array and the second antenna array is merely 7 dB to 14 dB. Therefore, if the antenna shown in FIG. 1 is used as a feed of a reflector antenna, a receiver of a microwave communication system to which the reflector antenna is applied is strongly interfered, and the reflector antenna is still not applicable to point-to-point microwave communication.

Figure 2:
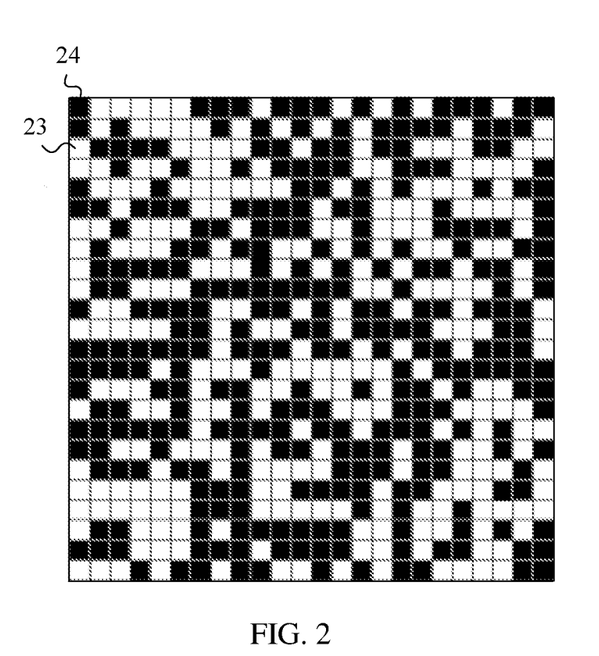
FIG. 2 is a schematic diagram of another array antenna.

FIG. 1 shows a case in which antenna units of the two antenna arrays are alternately disposed, so as to ensure that phase centers of two independent array antennas coincide. However, when units of the two independent antenna arrays are not alternately disposed, the phase centers of the two independent array antennas may also coincide, provided that equivalent radiation source points of the two independent antenna arrays coincide. FIG. 2 is a schematic diagram of another array antenna. As shown in FIG. 2, antenna units 23 form a first antenna array, antenna units 24 form a second antenna array, and the antenna units 23 and the antenna units 24 are all microstrip antennas. An arrangement manner of the antenna units 23 and the antenna units 24 is irregular. However, an arrangement of the antenna units 23 and the antenna units 24 can ensure that a phase center of the first antenna array coincides with that of the second antenna array. The phase center of the first antenna array coincides with that of the second antenna array. Therefore, the array antenna shown in FIG. 2 may share an antenna aperture. Using the array antenna shown in FIG. 2 as a feed of a reflector antenna enables the reflector antenna to be applied to point-to-point duplex communication.

Likewise, it can be seen from FIG. 2 that each antenna unit 23 and each antenna unit 24 may be adjacently disposed, or arranged in a relatively short distance. When transmitting a signal, each antenna unit 23 causes interference to the antenna units 24. A closer distance between the antenna unit 23 and an antenna unit 24 indicates stronger interference. Therefore, if the antenna shown in FIG. 2 is used as a feed of a reflector antenna, a receiver of a microwave communication system to which the reflector antenna is applied is strongly interfered, and the reflector antenna is still not applicable to point-to-point microwave communication.

In conclusion, this embodiment of the present invention provides the reflector antenna feed and the reflector antenna to which the feed is applied. A reflector antenna can operate in a duplex mode and can support point-to-point communication without using a duplexer.

Figure 3:
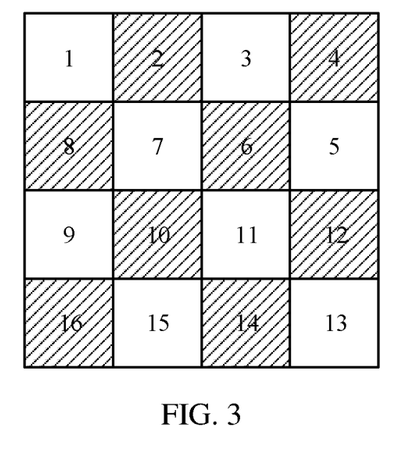
FIG. 3 is a schematic structural diagram of Embodiment 1 of a reflector antenna feed according to an embodiment of the present invention.

FIG. 3 is a schematic structural diagram of Embodiment 1 of a reflector antenna feed according to an embodiment of the present invention. As shown in FIG. 3, a reflector antenna in this embodiment includes: 2m transmit antenna units and 2n receive antenna units, where both m and n are positive integers. All the transmit antenna units are the same, all the receive antenna units are the same, and the transmit antenna units and the receive antenna units are alternately disposed. The 2m transmit antenna units form a transmit antenna array, and the 2n receive antenna units form a receive antenna array. In FIG. 3, an example in which m and n are both 4 is used for description. As shown in the figure, eight transmit antenna units and eight receive antenna units are respectively numbered from 1 to 16. An odd-number unit is a transmit antenna unit, and an even-number unit is a receive antenna unit.

It can be seen from FIG. 3 that the 2m transmit antenna units and the 2n receive antenna units are alternately disposed. Therefore, a geometric center of the transmit antenna array coincides with a geometric center of the receive antenna array; in this way, a phase center of the transmit antenna array coincides with that of the receive antenna array. Therefore, the reflector antenna feed provided in this embodiment can ensure that phase centers of a receive end feed and a transmit end feed are simultaneously disposed on a focus on a reflector, thereby supporting point-to-point communication.

Figure 4:
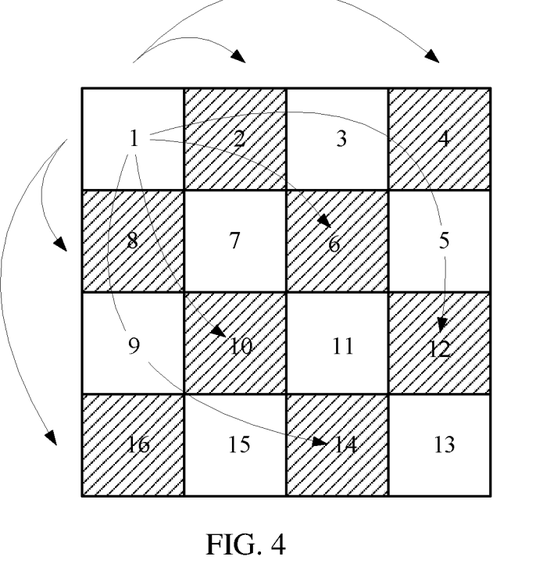
FIG. 4 is a schematic diagram of an interfering signal of an embodiment shown in FIG. 3.

Considering that the reflector antenna feed shown in FIG. 3 includes multiple transmit antenna units and multiple receive antenna units, when a transmit antenna unit transmits a signal, the transmit antenna unit causes interference to each receive antenna unit to different extents. For example, FIG. 4 is a schematic diagram of an interfering signal in the embodiment shown in FIG. 3. As shown in FIG. 4, when the transmit antenna array transmits a signal, a transmit antenna unit 1 causes interference to each receive antenna unit to different extents. A closer distance between the transmit antenna unit and a receive antenna unit indicates stronger interference. Likewise, other transmit antenna units except the transmit antenna unit 1 also cause interference to each receive antenna unit.

According to the reflector antenna feed provided in this embodiment of the present invention, a coupling unit is disposed between a transmit antenna unit and a receive antenna unit that are adjacent to each other, so as to reduce interference caused by each transmit antenna unit in a transmit antenna array to each receive antenna unit in a receive antenna array. The coupling unit is configured to reduce interference caused by a transmit antenna unit to a receive antenna unit, so as to increase isolation between the transmit antenna array and the receive antenna array.

When a transmit antenna unit transmits a signal, a coupling unit disposed between a transmit antenna unit and a receive antenna unit that are adjacent to each other can couple the signal transmitted by the transmit antenna unit into the receive antenna unit. To reduce interference caused by the transmit antenna unit to the receive antenna unit, the signal coupled by the coupling unit needs to meet specific amplitude and phase requirements, that is, an amplitude of the coupled signal needs to be the same as that of the interference, and a phase difference between the coupled signal and the interference needs to be an odd multiple of 180°.

A transmit antenna array and a receive antenna array separately include multiple antenna units, each transmit antenna unit causes interference to each receive antenna unit, and signals received by receive antenna units in the receive antenna array need to be processed after being combined by using a receive power combination network. Therefore, multiple coupling units may be disposed between a transmit antenna unit and a receive antenna unit that are adjacent to each other in the transmit antenna array and the receive antenna array, and the multiple coupling units are respectively configured to couple signals transmitted by different transmit antenna units. Signals transmitted by multiple transmit antenna units in the transmit antenna array are combined into a first signal, and the first signal generates a first interfering signal for the receive antenna array. A principle of disposing the multiple coupling units is to couple the first signal transmitted by the transmit antenna array and form a second signal in the receive antenna array. The second signal is used to reduce the first interfering signal generated by the transmit antenna array for the receive antenna array, so as to increase isolation between the transmit antenna array and the receive antenna array.

Figure 5:
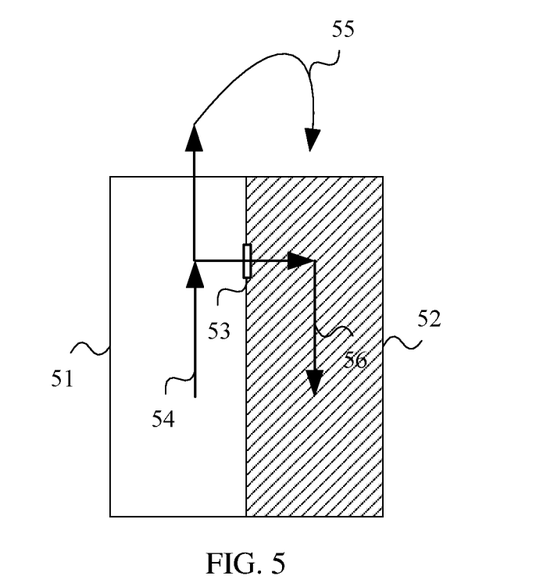
FIG. 5 is a schematic diagram of a coupling unit in a reflector antenna feed according to an embodiment of the present invention.

The following further describes disposition of a coupling unit by using an example in which one coupling unit is disposed between a transmit antenna unit and a receive antenna unit. As shown in FIG. 5, FIG. 5 is a schematic diagram of a coupling unit in a reflector antenna feed according to an embodiment of the present invention. It is assumed that an $i^{th}$ transmit antenna unit 51 is adjacent to a $j^{th}$ receive antenna unit 52, and a coupling unit 53 is disposed between the $i^{th}$ transmit antenna unit 51 and the $j^{th}$ receive antenna unit 52. When the $i^{th}$ transmit antenna unit 51 transmits a third signal 54, the $i^{th}$ transmit antenna unit 51 generates a second interfering signal 55 for the $j^{th}$ receive antenna unit. The coupling unit 53 couples the third signal 54 in the $i^{th}$ transmit antenna unit 51 and forms a fourth signal 56 in the $j^{th}$ receive antenna unit, and the fourth signal 56 is used to reduce the second interfering signal 55. Therefore, an amplitude of the fourth signal 56 needs to be the same as that of the second interfering signal 55, and a phase difference between the fourth signal 56 and the second interfering signal 55 needs to be an odd multiple of 180°.

A proper coupling unit 53 may be disposed as long as an amplitude and a phase of the second interfering signal 55 generated by the $i^{th}$ transmit antenna unit 51 for the $j^{th}$ receive antenna unit 52 is obtained, so as to form the fourth signal 56 in the $j^{th}$ receive antenna unit 52 and reduce interference caused by the second interfering signal 55 to the $j^{th}$ receive antenna unit. A specific calculation method for an amplitude and a phase formed by the coupling unit 53 is subsequently described in detail. The amplitude and a phase of the fourth signal 56 may be changed by changing a structure and a disposition position of the coupling unit 53, so that the fourth signal 56 can reduce the interference caused by the second interfering signal 55 to the $j^{th}$ receive antenna unit.

FIG. 5 gives a schematic description of disposition of the coupling unit 53 by using only an $i^{th}$ transmit antenna unit 51 and a $j^{th}$ receive antenna unit 52 that are adjacent to each other as an example. It should be noted that the coupling unit 53 disposed between the $i^{th}$ transmit antenna unit 51 and the $j^{th}$ receive antenna unit 52 couples the third signal 54 in the $i^{th}$ transmit antenna unit 51 and forms the fourth signal 56 in the $j^{th}$ receive antenna unit 52; however, the fourth signal 56 does not necessarily reduce the second interfering signal 55 generated by the $i^{th}$ transmit antenna unit 51 for the $j^{th}$ receive antenna unit 52. The fourth signal 56 may further be used to reduce interference caused by another transmit antenna unit in a transmit antenna array to another receive antenna unit. For example, an interfering signal generated by a $K^{th}$ transmit antenna unit for an $L^{th}$ receive antenna unit is obtained, and the interfering signal is assumed as a third interfering signal, and in this case the fourth signal 56 needs only to reduce the third interfering signal. K=1, 2, 3, . . . , M, L=1, 2, 3, . . . N, M is a quantity of antenna units in the transmit antenna array, and N is a quantity of antenna units in a receive antenna array. The $i^{th}$ transmit antenna unit 51 and the $K^{th}$ transmit antenna unit may be a same transmit antenna unit, or may be different transmit antenna units. The $j^{th}$ receive antenna unit 52 and the $L^{th}$ receive antenna unit may be a same receive antenna unit, or may be different receive antenna units.

A function of the coupling unit 53 between the $i^{th}$ transmit antenna unit 51 and the $j^{th}$ receive antenna unit 52 that are adjacent to each other is to couple the third signal 54 in the $i^{th}$ transmit antenna unit 51 and form the fourth signal 56 in the $j^{th}$ receive antenna unit 52. It only needs to ensure that the fourth signal 56 can reduce the third interfering signal generated by the $K^{th}$ transmit antenna unit for the $L^{th}$ receive antenna unit, and a method is to enable an amplitude of the fourth signal 56 to be the same as that of the third interfering signal and to enable a phase difference between the fourth signal 56 and the third interfering signal to be an odd multiple of 180°. The amplitude and the phase of the fourth signal 56 may be changed by changing the structure and the position of the coupling unit 53. Therefore, as long as the third interfering signal generated by the $K^{th}$ transmit antenna unit for the $L^{th}$ receive antenna unit is obtained, the structure and the position of the coupling unit 53 may be designed according to an amplitude and a phase of the third interfering signal, so that the amplitude of the fourth signal 56 is the same as that of the third interfering signal and a phase difference between the fourth signal 56 and the third interfering signal is an odd multiple of 180°.

Changing the structure of the coupling unit 53 may change a coupling degree between the coupling unit 53 and the third signal 54. The coupling degree is a percentage, which indicates a proportional relationship between the fourth signal 56 obtained by coupling the third signal 54 by the coupling unit 53 and an amplitude of the third signal 54. The third interfering signal generated by the $K^{th}$ transmit antenna unit for the $L^{th}$ receive antenna unit is also a signal obtained by spatially coupling a signal transmitted by the $K^{th}$ transmit antenna unit into the $L^{th}$ receive antenna unit. Therefore, the third interfering signal is also a coupling signal. After the transmit antenna array is designed, an amplitude ratio of the third signal 54 transmitted by the $i^{th}$ transmit antenna unit 51 to a signal transmitted by the $K^{th}$ transmit antenna unit, and a phase difference between the third signal 54 transmitted by the $i^{th}$ transmit antenna unit 51 and the signal transmitted by the $K^{th}$ transmit antenna unit are definite. Therefore, after the amplitude ratio of the third signal 54 transmitted by the $i^{th}$ transmit antenna unit to the signal transmitted by the $K^{th}$ transmit antenna unit and a coupling degree between the third interfering signal and the $K^{th}$ transmit antenna unit are calculated, a required coupling degree between the coupling unit 53 and the third signal 54 may be determined; then, the structure of the coupling unit 53 is properly set, and the amplitude of the fourth signal 56 may be the same as the amplitude of the third interfering signal generated by the $K^{th}$ transmit antenna unit for the $L^{th}$ receive antenna unit.

In addition, changing the position of the coupling unit 53 between the $i^{th}$ transmit antenna unit 51 and the $j^{th}$ receive antenna unit 52 may change a phase difference between the fourth signal 56 obtained by coupling the third signal 54 by the coupling unit 53 and the third interfering signal. A phase is a relative value. When a phase of the third signal 54 coupled by the coupling unit 53 changes, the phase of the fourth signal 56 changes accordingly. A difference between a phase value of a signal transmitted by the $K^{th}$ transmit antenna unit and a phase value of the third signal 54 in the $i^{th}$ transmit antenna unit 51 is fixed. Therefore, a difference between a phase value of the third interfering signal generated by the signal transmitted by the $K^{th}$ transmit antenna unit for the $L^{th}$ receive antenna unit and the phase value of the third signal 54 in the $i^{th}$ transmit antenna unit 51 is also fixed. Therefore, a phase value difference between the fourth signal 56 and the third signal 54 may be changed by setting the position of the coupling unit 53, so that a difference between a phase value of the fourth signal 56 and the phase value of the third interfering signal generated by the signal transmitted by the $K^{th}$ transmit antenna unit for the $L^{th}$ receive antenna unit is an odd multiple of 180°.

A specific calculation method for a coupling degree and a phase of the coupling unit 53 is subsequently described in detail.

Relative positions of each transmit antenna unit in the transmit antenna array and each receive antenna unit in the receive antenna array are different. Therefore, amplitudes and phases of interference caused by each transmit antenna unit to each receive antenna unit are different. Therefore, multiple coupling units may be disposed between each transmit antenna unit and each receive antenna unit, and the multiple coupling units are separately configured to cancel interference of different amplitudes and phases. In another aspect, the reflector antenna feed shown in FIG. 4 is used as an example. Theoretically, interference caused by the transmit antenna unit 1 to a receive antenna unit 2, interference caused by a transmit antenna unit 3 to a receive antenna unit 4, interference caused by a transmit antenna unit 13 to a receive antenna unit 14, and interference caused by a transmit antenna unit 15 to a receive antenna unit 16 are the same. Therefore, a coupling unit needs only to be disposed between the transmit antenna unit 1 and the receive antenna unit 2, and the foregoing four types of interference may be reduced, so that a quantity of disposed coupling units may be reduced.

After interference caused by each transmit antenna unit in the transmit antenna array to each receive antenna unit in the receive antenna array is analyzed, and same interference is combined, a combined interfering signal generated by the transmit antenna array for the receive antenna array is obtained, and the combined interfering signal includes multiple components. Coupling units may be disposed between multiple transmit antenna units and receive antenna units that are adjacent to each other, so that each coupling unit forms a signal corresponding to each component of the combined interfering signal. The signal formed by each coupling unit is used to reduce one component of the combined interfering signal, so as to reduce the combined interfering signal generated by the transmit antenna array for the receive antenna array.

Generally, a closer distance between a transmit antenna unit and a receive antenna unit indicates stronger interference generated. Therefore, reducing interference between a transmit antenna unit and a receive antenna unit may be first considered.

In the reflector antenna feed in the embodiment shown in FIG. 3, each transmit antenna unit and each receive antenna unit may be implemented by using a rectangular waveguide, or optionally, may be implemented by using a square waveguide. However, this is not limited in this embodiment of the present invention. For example, each transmit antenna unit and each receive antenna unit may further be implemented by using a rectangular waveguide, a circular waveguide, or a horn antenna based on the square waveguide, the circular waveguide, or the rectangular waveguide.

In an example in which each transmit antenna unit and each receive antenna unit are square waveguides, in the embodiment shown in FIG. 5, the coupling unit 53 may be a hole on an adjacent surface between an $i^{th}$ transmit antenna unit 51 and a $j^{th}$ receive antenna unit 52 that are adjacent to each other. Optionally, the hole is round-shaped. When a diameter of the hole is relatively small, coupling of a transmit signal of the $i^{th}$ transmit antenna unit 51 by the hole may be analyzed according to a hole diffraction field theory. A fundamental formula for a hole diffraction field is:

$$A_k^\pm = \pm \frac{j\omega}{2}(\mu_0 p_u^* H_{2u}^{0\mp} H_{1u}^{0+} + \mu_0 p_v^* H_{2v}^{\mp 0} H_{1v}^{0+} + \varepsilon_0 pE_{2n}^{0\mp} E_{1n}^{0+}).$$

A symbol "+" and a symbol "−" of a symbol "±" on the right of an equal sign respectively indicate a scattered field of the $i^{th}$ transmit antenna unit 51 and a scattered field of the $j^{th}$ receive antenna unit 52. A symbol "+" and a symbol "−"

in the upper right corner of E and H respectively represent a forward wave (whose direction is the same as that of the transmit signal) and a backward wave (whose direction is opposite to that of the transmit signal). $p_u^*$ and $p_v^*$ are respectively a polarized magnetic permeability in a u direction and in a v direction of a local coordinate of the hole; p is a normal electric susceptibility of the hole; $\mu_0$ and $\varepsilon_0$ are respectively a free space magnetic permeability and a dielectric constant; $H_{1u}$, $H_{1v}$, and $E_{1n}$ are normalized magnetic field tangential components and an electric field normal component of an incident wave that are of the $i^{th}$ transmit antenna unit 51 and that are in a position of the hole; $H_{2u}$, $H_{2v}$, and $E_{2n}$ are corresponding normalized components of excited waves that are of the $j^{th}$ receive antenna unit 52 and that are in the position of the hole.

An electric susceptibility and a magnetic susceptibility of the round hole are:

$p=(2/3)r_0^3$ $p_u^*=p_v^*=(4/3)r_0^3$ where $r_0$ is a radius of the hole.

A coupling degree C. between the coupling unit 53 and the transmit signal is:

$C=10 \log_{10}|A_k^-|^2=20 \log_{10}|A_k^-|$.

The coupling degree C. determines the amplitude of the fourth signal formed by the coupling unit 53.

If the adjacent surface between the $i^{th}$ transmit antenna unit 51 and the $j^{th}$ receive antenna unit 52 that are adjacent to each other has a specific thickness t, t needs to be used as a correction factor, and a scattering formula of the hole is corrected according to a related theory. As the thickness t increases, a value of the coupling degree C. decreases. Increasing the radius $r_0$ of the hole may increase the coupling degree. However, the radius of the hole does not unlimitedly increase, and is limited by dimensions of the $i^{th}$ transmit antenna unit 51 and the $j^{th}$ receive antenna unit 52.

Figure 6:
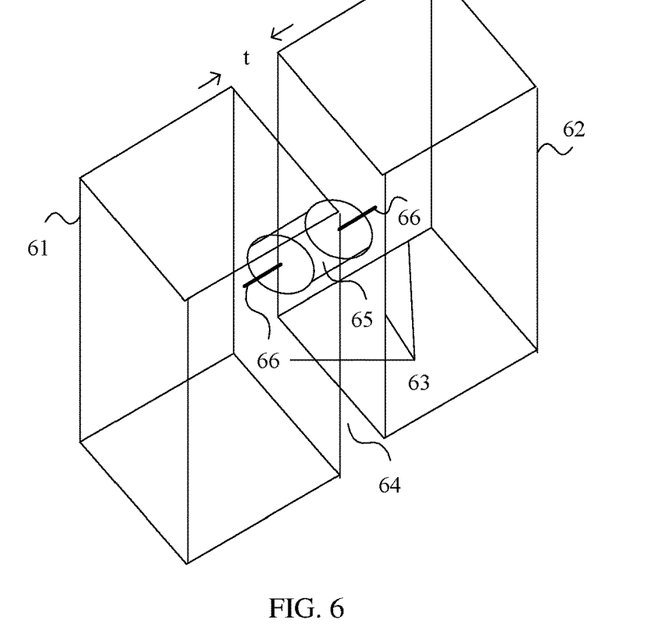
FIG. 6 is a schematic diagram of another coupling unit in a reflector antenna feed according to an embodiment of the present invention.

The coupling unit is not limited by the foregoing hole. The following further provides a manner of disposing the coupling unit. FIG. 6 is a schematic diagram of another coupling unit in a reflector antenna feed according to an embodiment of the present invention. As shown in FIG. 6, still in an example in which each transmit antenna unit and each receive antenna unit are square waveguides, a coupling unit 63 may be a coaxial probe disposed between an $i^{th}$ transmit antenna unit 61 and a $j^{th}$ receive antenna unit 62 that are adjacent to each other.

In FIG. 6, an adjacent surface 64 between the $i^{th}$ transmit antenna unit 61 and the $j^{th}$ receive antenna unit 62 has a specific thickness t. A cylindrical hole whose diameter is D is disposed on the adjacent surface 64, and an inner wall of the cylindrical hole is made of metal. The $i^{th}$ transmit antenna unit 61 and the $j^{th}$ receive antenna unit 62 are rectangular waveguides, circular waveguides, or horn antennas based on a square waveguide, a circular waveguide, or a rectangular waveguide, which are generally made of metal. Therefore, the inner wall of the cylindrical hole disposed on the adjacent surface 64 is made of metal; in addition, the adjacent surface 64 that is between the $i^{th}$ transmit antenna unit 61 and the $j^{th}$ receive antenna unit 62 and that has a thickness t is also made of metal. The cylindrical hole is filled with a dielectric 65 that has a relative dielectric constant $\varepsilon_r$ and a relative magnetic permeability $\mu_r$. An inner conductor 66 that has a diameter d is embedded into a center of the dielectric 65, and the inner conductor 66 has a same axis center as the cylindrical hole. The inner conductor 66 separately extends and goes into the $i^{th}$ transmit antenna unit 61 and the $j^{th}$ receive antenna unit 62, and is configured to couple a transmit signal from the $i^{th}$ transmit antenna unit 61 to the $j^{th}$ receive antenna unit 62. The inner conductor 66, the dielectric 65, and the cylindrical hole having a metal inner wall form a coaxial line, and the coaxial line is the coupling unit 63. The inner conductor 66 may couple the transmit signal of the $i^{th}$ transmit antenna unit 61 into the $j^{th}$ receive antenna unit 62. When a required coupling factor is relatively large, design of the coaxial line needs to prevent a wavelength of the coupling signal from falling within a cut-off wavelength range of the structure. A cut-off wavelength $\lambda_c$ of a TE11 mode on the coaxial line may be calculated according to a coaxial line parameter:

$$\lambda_c = \pi\left(\frac{D+d}{2}\right)\sqrt{\varepsilon_r \mu_r}.$$

That is, wavelengths of the transmit signal of the $i^{th}$ transmit antenna unit 61 and a signal coupled by the coupling unit 63 into the $j^{th}$ receive antenna unit 62 need to be greater than $\lambda_c$.

Coupling degrees of coupling units of different forms may be obtained by using electromagnetic optimization software or a like means. Calculation of a coupling degree of the coupling unit shown in FIG. 6 is not described in this embodiment.

The foregoing calculation considers only an amplitude of a signal coupled by a coupling unit. The following considers a phase relationship of a signal coupled by a coupling unit. The embodiment shown in FIG. 5 is used as an example. In FIG. 5, the amplitude of the fourth signal obtained by coupling, by the coupling unit 53, the third signal in the $i^{th}$ transmit antenna unit 51 into the $j^{th}$ receive antenna unit 52 needs to be the same as that of the second interfering signal generated by the $i^{th}$ transmit antenna unit 51 for the $j^{th}$ receive antenna unit 52. However, to ensure that the amplitude of the fourth signal is the same as that of the second interfering signal, and the phase difference between the fourth signal and the second interfering signal is an odd multiple of 180°, the position of the coupling unit 53 needs to be correspondingly designed.

Figure 7:
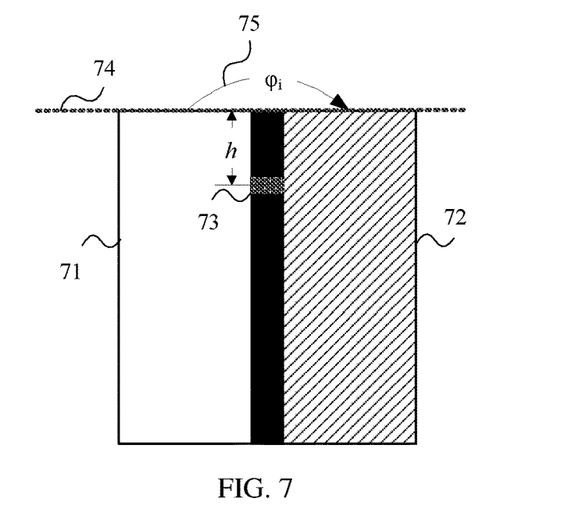
FIG. 7 is a schematic diagram of still another coupling unit in a reflector antenna feed according to an embodiment of the present invention.

FIG. 7 is a schematic diagram of still another coupling unit in a reflector antenna feed according to an embodiment of the present invention. In FIG. 7, it is assumed that an aperture of an $i^{th}$ transmit antenna unit 71 and a $j^{th}$ receive antenna unit 72 is a phase reference plane, that is, a plane 74. A distance between a center of a coupling unit 73 and the plane 74 is h. It is assumed that, after a second interfering signal 75 generated by a third signal transmitted by the $i^{th}$ transmit antenna unit 71 for the $j^{th}$ receive antenna unit 72 is spatially coupled, a phase variation of the second interfering signal 75 compared with the third signal is $\varphi_i \cdot \varphi'_i$, is a phase variation of a fourth signal compared with the third signal, that is, a transmission phase characteristic of the coupling unit 73, after the fourth signal is obtained by coupling, by the coupling unit 73, the third signal in the $i^{th}$ transmit antenna unit 71 into the $j^{th}$ receive antenna unit 72.

The following formula needs to be met, so as to cancel the second interfering signal 75 and the fourth signal:

$$\left(\varphi_i + \frac{2\pi h}{\lambda_{g2}}\right) - \left(-\frac{2\pi h}{\lambda_{g1}} + \varphi_i\right) = \pm(2n+1)\pi, n = 0, 1, \ldots$$

A formula obtained by collating the foregoing formula is:

$$(\varphi_i - \varphi'_i) + 2\pi h\left(\frac{1}{\lambda_{g1}} + \frac{1}{\lambda_{g2}}\right) = \pm(2n+1)\pi, n = 0, 1, \ldots$$

where $\lambda_{g1}$ and $\lambda_{g2}$ are respectively a waveguide wavelength of the $i^{th}$ transmit antenna unit 71 and a waveguide wavelength of the $j^{th}$ receive antenna unit 72.

It should be noted that a signal coupled by a coupling unit from a transmit antenna unit does not necessarily cancel interference caused by an adjacent transmit antenna unit to a receive antenna unit. An entire receive antenna array combines signals of receive antenna units in a receive power combination network. Therefore, for the entire receive antenna array, an amplitude of a signal coupled by the coupling unit needs only to be the same as that of interference caused by an entire transmit antenna array to the receive antenna array, and a phase difference between the signal coupled by the coupling unit and the interference caused by the entire transmit antenna array to the receive antenna array needs only to be an odd multiple of 180°.

It should be noted that, in the foregoing embodiments of the present invention, an antenna array whose antenna units are alternately disposed in a transmit antenna array and a receive antenna array is used only as an example to describe the reflector antenna feed provided in this embodiment of the present invention; however, a reflector antenna feed provided in the present embodiments is not limited by this. For example, according to the reflector antenna feed provided in this embodiment of the present invention, a coupling unit may further be disposed based on the antenna array shown in FIG. 2. The implementation principles and technical effects thereof are similar to those in FIG. 3 to FIG. 7, and details are not described herein.

Figure 8:
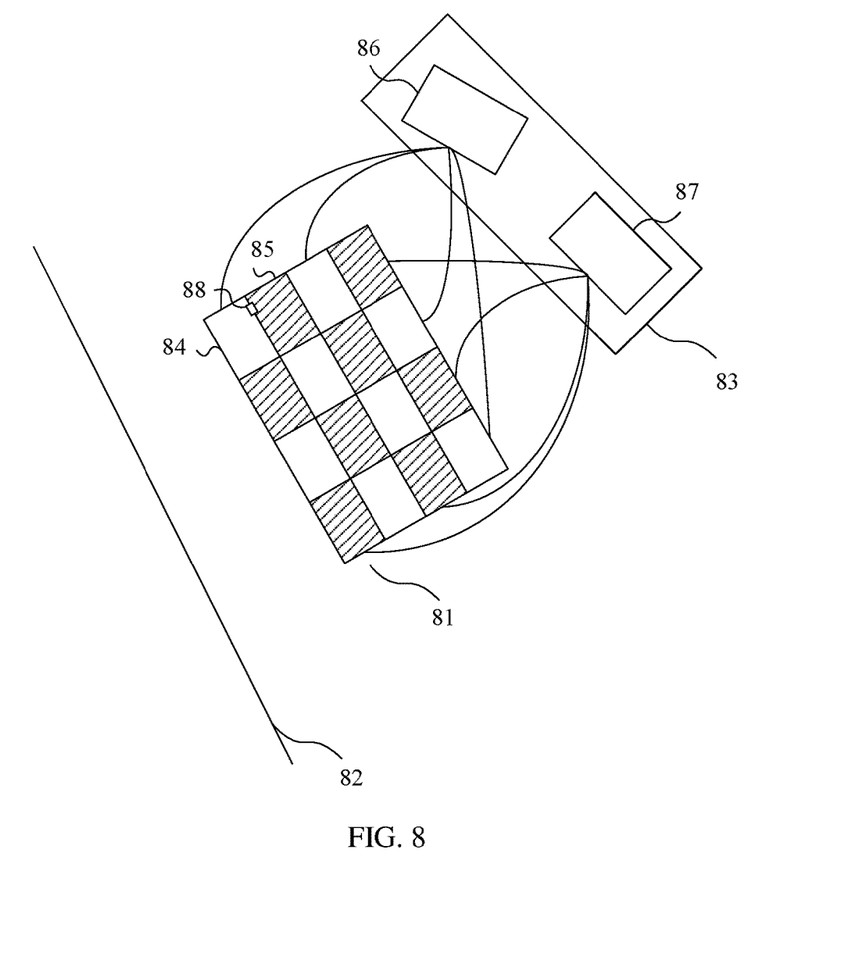
FIG. 8 is a schematic structural diagram of Embodiment 1 of a reflector antenna according to an embodiment of the present invention.

FIG. 8 is a schematic structural diagram of Embodiment 1 of a reflector antenna according to an embodiment of the present invention. As shown in FIG. 8, the reflector antenna in this embodiment includes: a feed 81, a reflector 82, and a power distribution network 83.

The feed 81 includes a transmit antenna array and a receive antenna array, where the transmit antenna array includes at least two transmit antenna units 84, the receive antenna array includes at least two receive antenna units 85, a phase center of the transmit antenna array coincides with that of the receive antenna array, and the phase centers of the transmit antenna array and the receive antenna array coincide with a focus on the reflector 82.

The power distribution network 83 includes a transmit power distribution network 86 and a receive power combination network 87, the transmit antenna array is connected to the transmit power distribution network 86, and the receive antenna array is connected to the receive power combination network 87. At least one coupling unit 88 is disposed between at least one group of a transmit antenna unit 84 and a receive antenna unit 85 that are adjacent to each other, where the at least one coupling unit 88 is configured to increase isolation between the transmit antenna array and the receive antenna array, so as to reduce interference caused by the transmit antenna array to a signal transmitted by the receive antenna array to the receive power combination network.

In this embodiment, the feed 81 may be the reflector antenna feed shown in FIG. 3. For a disposition relationship among the transmit antenna unit 84, the receive antenna unit 85, and the coupling unit 88, refer to FIG. 5 to FIG. 7. A transmit aperture of the feed 81 faces the reflector 82, and phase centers of the transmit antenna array and the receive antenna array of the feed 81 coincide, and coincide with the focus on the reflector 82. Both of the phase centers of the transmit antenna array and the receive antenna array of the feed 81 coincide with the focus on the reflector 82. Therefore, the feed 81 is equivalent to a feed that has a duplex capability.

The at least one coupling unit 88 disposed between the transmit antenna unit 84 and the receive antenna unit 85 that are adjacent to each other reduces interference caused by the transmit antenna unit 84 to the receive antenna unit 85, and increases the isolation between the transmit antenna array and the receive antenna array, so that the reflector antenna provided in this embodiment may be applied to point-to-point microwave communication on the premise that a duplexer is not disposed.

In the reflector antenna provided in this embodiment, a specific structure and an implementation principle of the feed 81 are similar to those in the embodiments shown in FIG. 3 to FIG. 7, and details are not described herein. It should be noted that a reflector antenna feed provided in the present embodiments is not limited by this. For example, according to the reflector antenna feed provided in this embodiment of the present invention, a coupling unit may further be disposed based on the antenna array shown in FIG. 2. The implementation principles and technical effects thereof are similar to those in FIG. 3 to FIG. 7, and details are not described herein.

Optionally, a form of a reflector antenna feed shown in FIG. 8 is optionally an offset feed, and the reflector antenna is an offset-feed reflector antenna.

A reflector antenna shown in FIG. 7 is a case of a single reflector antenna. In addition, the reflector antenna feed provided in this embodiment of the present invention may further be applied to a double reflector antenna, for example, a Cassegrain antenna.

Persons of ordinary skill in the art may understand that all or some of the steps of the method embodiments may be implemented by a program instructing relevant hardware. The program may be stored in a computer-readable storage dielectric. When the program runs, the steps of the method embodiments are performed. The foregoing storage dielectric includes: any dielectric that can store program code, such as a read only memory (ROM), a random access memory (RAM), a magnetic disk, or an optical disc.

Finally, it should be noted that the foregoing embodiments are merely intended for describing the technical solutions of the present embodiments, but not for limiting the present embodiments. Although the present embodiments are described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present embodiments shall be subject to the protection scope of the claims.

What is claimed is:

1. A reflector antenna feed comprising:
    a transmit antenna array, wherein the transmit antenna array comprises a plurality of transmit antenna units including a first transmit antenna unit;
    a receive antenna array, wherein the receive antenna array comprises a plurality of receive antenna units including a first receive antenna unit, wherein the first receive antenna unit is adjacent to the first transmit antenna unit, and wherein a phase center of the transmit antenna array coincides with a phase center of the receive antenna array; and a first coupling unit disposed between the first transmit antenna unit and the first receive antenna unit, wherein the first coupling unit is configured to reduce interference caused by the transmit antenna array to the receive antenna array, wherein the first transmit antenna unit is a square waveguide, a circular waveguide, a rectangular waveguide, or a horn antenna based on a square waveguide, a circular waveguide, or a rectangular waveguide, wherein the first receive antenna unit is a square waveguide, a circular waveguide, a rectangular waveguide, or a horn antenna based on a square waveguide, a circular waveguide, or a rectangular waveguide; and wherein a hole having a metal inner wall is disposed on an adjacent surface between the first transmit antenna unit and the first receive antenna unit, wherein an inner conductor is disposed in a center of the hole having the metal inner wall, wherein a dielectric is disposed between the inner conductor and the hole having a metal inner wall, wherein the inner conductor separately extends into the first transmit antenna unit and the first receive antenna unit, wherein the hole having the metal inner wall, the inner conductor, and the dielectric form the first coupling unit, and wherein the hole is configured to couple a signal transmitted by the first transmit antenna unit into the first receive antenna unit.

2. The reflector antenna feed according to claim 1, wherein the plurality of transmit antenna units and the plurality of receive antenna units are alternately disposed.

3. The reflector antenna feed according to claim 1, wherein the first coupling unit is configured to couple a first signal transmitted by the transmit antenna array and form a second signal in the receive antenna array, and wherein the second signal reduces a first interfering signal generated by the transmit antenna array for the receive antenna array.

4. The reflector antenna feed according to claim 3, wherein a second coupling unit of the plurality of coupling units is between an $i^{th}$ transmit antenna unit of the plurality of transmit antenna units and a $j^{th}$ receive antenna unit of the plurality of receive antenna units, wherein the $i^{th}$ transmit antenna unit is adjacent to the $j^{th}$ receive antenna unit, wherein the second coupling unit is configured to couple a third signal transmitted by the $i^{th}$ transmit antenna unit and form a fourth signal in the $j^{th}$ receive antenna unit, wherein the fourth signal reduces a second interfering signal generated by a $K^{th}$ transmit antenna unit of the plurality of transmit antenna units for an $L^{th}$ receive antenna unit of the plurality of receive antenna units, wherein an amplitude of the fourth signal is the same as an amplitude of the second interfering signal, wherein a phase difference between the fourth signal and the second interfering signal is an odd multiple of 180°, wherein K=1, 2, 3, . . . , M, L=1, 2, 3, . . . , N, wherein M is a quantity of antenna units in the transmit antenna array, and wherein N is a quantity of antenna units in the receive antenna array.

5. A reflector antenna comprising:
a feed comprising:
a transmit antenna array, wherein the transmit antenna array comprises plurality of transmit antenna units;
a receive antenna array, the receive antenna array comprises plurality of receive antenna units, wherein a phase center of the transmit antenna array coincides with a phase center of the receive antenna array; and
a first coupling unit disposed between a first transmit antenna unit of the plurality of transmit antenna units and a first receive antenna unit of the plurality of receive antennal units, wherein the first transmit antenna unit is adjacent to the first receive antenna unit, and wherein the first coupling unit is configured to reduce interference caused by the transmit antenna array to the receive antenna array;
a reflector, wherein the phase center of the transmit antenna array and the phase center of the receive antenna array coincide with a focus on the reflector;
a power distribution network, wherein the power distribution network comprises:
a transmit power distribution network; and
a receive power combination network, the transmit antenna array is connected to the transmit power distribution network, and the receive antenna array is connected to the receive power combination network, wherein the first transmit antenna unit is a square waveguide, a circular waveguide, a rectangular waveguide, or a horn antenna based on a square waveguide, a circular waveguide, or a rectangular waveguide, wherein the first receive antenna unit is a square waveguide, a circular waveguide, a rectangular waveguide, or a horn antenna based on a square waveguide, a circular waveguide, or a rectangular waveguide; and wherein a hole having a metal inner wall is disposed on an adjacent surface between the first transmit antenna unit and the first receive antenna unit, wherein an inner conductor is disposed in a center of the hole having the metal inner wall, wherein a dielectric is disposed between the inner conductor and the hole having a metal inner wall, wherein the inner conductor separately extends into the first transmit antenna unit and the first receive antenna unit, wherein the hole having the metal inner wall, the inner conductor, and the dielectric form the first coupling unit, and wherein the hole is configured to couple a signal transmitted by the first transmit antenna unit into the first receive antenna unit.

6. The reflector antenna according to claim 5, wherein the plurality of transmit antenna units and the plurality of receive antenna units are alternately disposed.

7. The reflector antenna according to claim 5, wherein the first coupling unit is configured to couple a first signal transmitted by the transmit antenna array and form a second signal in the receive antenna array, and wherein the second signal reduces a first interfering signal generated by the transmit antenna array for the receive antenna array.

8. The reflector antenna according to claim 7, wherein a second coupling unit between an $i^{th}$ transmit antenna unit of the plurality of transmit antenna units and a $j^{th}$ receive antenna unit of the plurality of receive antenna units, wherein the $i^{th}$ transmit antenna unit is adjacent to the $j^{th}$ receive antenna unit, wherein the second coupling unit is configured to couple a third signal transmitted by the $i^{th}$ transmit antenna unit and form a fourth signal in the $j^{th}$ receive antenna unit, wherein the fourth signal reduces a second interfering signal generated by a $K^{th}$ transmit antenna unit of the plurality of transmit antenna units for an $L^{th}$ receive antenna unit of the plurality of receive antenna units, wherein an amplitude of the fourth signal is the same as an amplitude of the second interfering signal, wherein a phase difference between the fourth signal and the second interfering signal is an odd multiple of 180°, and wherein K=1, 2, 3, . . . , M, L=1, 2, 3, . . . , N, M is a quantity of antenna units in the transmit antenna array, and N is a quantity of antenna units in the receive antenna array.

9. The reflector antenna according to claim 5, wherein the reflector antenna is an offset-feed reflector antenna.

10. A reflector antenna feed comprising:
a transmit antenna array, wherein the transmit antenna array comprises a plurality of transmit antenna units including a first transmit antenna unit and a second transmit antenna unit;
a receive antenna array, wherein the receive antenna array comprises a plurality of receive antenna units including a first receive antenna unit and a second receive antenna unit, wherein the first receive antenna unit is adjacent to the first transmit antenna unit, wherein the first receive antenna unit is remote to the second transmit antenna unit, and wherein a phase center of the transmit antenna array coincides with a phase center of the receive antenna array;
a first coupling unit disposed on a sidewall between the first transmit antenna unit and the first receive antenna unit, wherein the first coupling unit is configured to couple a signal transmitted by the first transmit antenna unit into the first receive antenna unit; and
a second coupling unit disposed on the sidewall between the first transmit antenna unit and the first receive antenna unit, wherein the second coupling unit is configured to couple a signal transmitted by the second transmit antenna unit into the first receive antenna unit.

11. The reflector antenna feed according to claim 10, wherein the first and second transmit antenna units are square waveguides, circular waveguides, rectangular waveguides, or horn antennas based on square waveguides, circular waveguides, or rectangular waveguides.

12. The reflector antenna feed according to claim 11, wherein the first and second receive antenna units are square waveguides, circular waveguides, rectangular waveguides, or horn antennas based on square waveguides, circular waveguides, or rectangular waveguides.

13. The reflector antenna feed according to claim 10, wherein a hole having a metal inner wall is disposed on an adjacent surface between the first transmit antenna unit and the first receive antenna unit, wherein an inner conductor is disposed in a center of the hole having the metal inner wall, wherein a dielectric is disposed between the inner conductor and the hole having a metal inner wall, wherein the inner conductor separately extends into the first transmit antenna unit and the first receive antenna unit, and wherein the hole having the metal inner wall, the inner conductor, and the dielectric form the first coupling unit.

14. The reflector antenna feed according to claim 10, wherein an arrangement of the transmit antenna array and the receive antenna array is an irregular arrangement.

* * * * *